United States Patent
Ben-Asher et al.

(10) Patent No.: US 10,280,335 B2
(45) Date of Patent: May 7, 2019

(54) PREPARATION OF POLYAMIDE-IMIDE RESINS USING N-FORMYL MORPHOLINE:3-METHOXY N,N-DIMETHYLPROPANAMIDE

(71) Applicant: CYMER-DAYTON, LLC, Decatur, TN (US)

(72) Inventors: Limor Ben-Asher, Cresskill, NJ (US); David Edward Noga, Spring City, TN (US); Zhongliang Zhu, Fremont, CA (US); Anderson Bouton, Chattanooga, TN (US)

(73) Assignee: Cymer-Dayton, LLC, Decatur, TN (US)

( * ) Notice: Subject to any disclaimer, the term of this patent is extended or adjusted under 35 U.S.C. 154(b) by 76 days.

(21) Appl. No.: 15/249,294

(22) Filed: Aug. 26, 2016

(65) Prior Publication Data

US 2017/0349706 A1 Dec. 7, 2017

Related U.S. Application Data

(60) Provisional application No. 62/346,443, filed on Jun. 6, 2016, provisional application No. 62/347,020, filed on Jun. 7, 2016, provisional application No. 62/346,440, filed on Jun. 6, 2016.

(51) Int. Cl.

| | | |
|---|---|---|
| *C09D 179/08* | (2006.01) | |
| *B01J 2/02* | (2006.01) | |
| *C08J 3/14* | (2006.01) | |
| *C08G 73/10* | (2006.01) | |
| *C08G 73/14* | (2006.01) | |
| *C09D 7/20* | (2018.01) | |
| *C09D 5/16* | (2006.01) | |
| *C08J 7/04* | (2006.01) | |
| *C08K 5/00* | (2006.01) | |

(52) U.S. Cl.
CPC ............ *C09D 179/08* (2013.01); *B01J 2/02* (2013.01); *C08G 73/1003* (2013.01); *C08G 73/14* (2013.01); *C08J 3/14* (2013.01); *C08J 7/047* (2013.01); *C09D 5/1637* (2013.01); *C09D 7/20* (2018.01); *C08J 2379/08* (2013.01); *C08J 2479/08* (2013.01); *C08K 5/0008* (2013.01)

(58) Field of Classification Search
CPC ......... C08G 73/14; C08J 2379/08; C09D 7/20
See application file for complete search history.

(56) References Cited

U.S. PATENT DOCUMENTS

| | | |
|---|---|---|
| 3,267,074 A | 8/1966 | Wood |
| 4,205,162 A | 5/1980 | Herscovici |
| 4,259,221 A | 5/1981 | Pauze |
| 4,480,088 A | 10/1984 | Pike |
| 5,135,974 A | 8/1992 | Moore |
| 6,048,924 A | 4/2000 | Obayashi et al. |
| 6,172,129 B1 | 1/2001 | Fan et al. |
| 6,232,372 B1 | 5/2001 | Brothers et al. |
| 6,420,466 B1 | 7/2002 | Haubennestel et al. |
| 6,479,581 B1 | 11/2002 | Ireland et al. |
| 7,998,370 B2 | 8/2011 | Hama et al. |
| 8,669,305 B2 | 3/2014 | Fujimoto et al. |
| 9,725,617 B2 * | 8/2017 | Kelly ................... C09D 179/08 |
| 2005/0025978 A1 | 2/2005 | Okada et al. |
| 2005/0215689 A1 | 9/2005 | Garbar et al. |
| 2008/0312356 A1 | 12/2008 | Kobrin et al. |
| 2013/0217812 A1 | 8/2013 | Sidenstick et al. |
| 2015/0018466 A1 * | 1/2015 | Reynolds ............... C09D 5/002 |
| | | 524/195 |
| 2015/0299513 A1 * | 10/2015 | Kelly ................... C09D 179/08 |
| | | 524/96 |

FOREIGN PATENT DOCUMENTS

| | | | |
|---|---|---|---|
| WO | WO 2015/144663 | * | 1/2015 |
| WO | 2015144663 | | 10/2015 |

OTHER PUBLICATIONS

PCT/US2017/35999 International Search Report dated Aug. 28, 2017.
PCT/US2017/35997 International Search Report dated Aug. 28, 2017.
PCT/US2017/35998 International Search Report dated Aug. 28, 2017.

* cited by examiner

Primary Examiner — Gregory Listvoyb

(57) ABSTRACT

Embodiments generally relate to preparation of polyamide-imide resins using N-Formyl Morpholine:3-Methoxy N,N-Dimethylpropanamide. An embodiment of a method includes generating a polymer solution using a polymerization process, the polymerization process including preparing a solvent including at least N-formylmorpholine (NFM) or a combination of NFM with 3-methoxy N,N-dimethylpropanamide (MDP) as a cosolvent, mixing methylene diphenyl diisocyanate (MDI) and trimellitic anhydride (TMA) with the solvent to generate the polymer solution, and diluting the polymer solution by adding an NFM:MDP solvent mixture or MDP into the generated polymer solution. The method further includes processing the diluted polymer solution to generate polyamideimide polymer or a polyamide-amic acid resin polymer.

10 Claims, 3 Drawing Sheets

| Title | PAI Polymerization Solution | NFM (g) | MDP (g) | TMA (g) | MDI (g) | TMA:MDI Mole Ratio | Percent rxn Solids | Prepolymer Temp (°C) | Time (hrs) |
|---|---|---|---|---|---|---|---|---|---|
| Mfr Ex. 1 | 90:10 NFM:MDP | 192.20 | 21.35 | 64.30 | 79.30 | 1.01 | 34.5 | 90 | 2 |
| Mfr Ex. 2 | 70:30 NFM:MDP | 149.50 | 64.05 | 61.26 | 79.35 | 1.01 | 34.5 | 90 | 2 |
| Mfr Ex. 3 | 30:70 NFM:MDP | 64.05 | 149.45 | 61.26 | 79.35 | 1.01 | 34.5 | 90 | 2 |
| Mfr Ex. 4 | 10:90 NFM:MDP | 21.35 | 192.15 | 61.26 | 79.35 | 1.01 | 34.5 | 90 | 2 |
| Mfr Ex. 5 | 100% NFM Diluted to 70:30 NFM:MDP | 213.50 | 0.00 | 61.26 | 79.35 | 1.01 | 34.5 | 90 | 2 |
| Mfr Ex. 6 | 70:30 NFM:MDP to Water-Based | 149.50 | 64.05 | 61.26 | 79.35 | 1.01 | 34.5 | 90 | 2 |
| Mfr Ex. 7 | 100% NFM Diluted to Water-Based | 213.50 | 0.00 | 61.26 | 79.35 | 1.01 | 34.5 | 90 | 2 |
| Comp Ex. 1 | 100% NFM Diluted to 70:30 NFM:CHN | 213.50 | 0.00 | 61.26 | 79.35 | 1.01 | 34.5 | 90 | 2 |
| Comp Ex. 2 | 100% NFM Diluted to 70:30 NFM:PC | 213.50 | 0.00 | 61.26 | 79.35 | 1.01 | 34.5 | 90 | 2 |

Fig. 2A

| Title | Polymerization | | Final Mass % | | Turpid. NTUS | Visual Haze | Visc. Cps DV III 23C | % Solids (MB) | Acid # mg KOH/g | GPC Data | | | Coating Film Thickness (μm) | Coating Cracking (cm) |
|---|---|---|---|---|---|---|---|---|---|---|---|---|---|---|
| | Temp (C) | Time (h) | % Amine | % Water | | | | | | Mn | Mw | PD | | |
| Mfr Ex. 1 | 160 | 8 | - | - | 2.60 | Clear | 15,320 | 28.54 | 10.60 | 6,242 | 17,235 | 2.76 | 135 | Pass |
| Mfr Ex. 2 | 160 | 8 | - | - | 1.30 | Clear | 20,590 | 26.42 | 9.05 | 11,944 | 32,192 | 2.70 | 140/160 | Pass |
| Mfr Ex. 3 | 160 | 8 | - | - | 2.40 | Clear | 12,540 | 26.98 | 8.34 | 14,829 | 41,392 | 2.80 | 130 | Pass |
| Mfr Ex. 4 | 160 | 8 | - | - | 11.40 | Hazy | 7,797 | 25.98 | 9.51 | 15,330 | 46,352 | 3.02 | - | - |
| Mfr Ex. 5 | 160 | 8 | - | 11 | 5.60 | Clear | 27,128 | 28.16 | 6.41 | 17,054 | 31,459 | 1.84 | 80 | Pass |
| Mfr Ex. 6 | 160 | 8 | 10 | 17 | 2.70 | Clear | 6,366 | 28.10 | 127.80 | 6,460 | 23,400 | 3.62 | - | - |
| Mfr Ex. 7 | 160 | 8 | 6 | - | 2.32 | Clear | 6,549 | 28.00 | 129.00 | 7,340 | 25,600 | 3.49 | - | - |
| Comp Ex. 1 | 160 | 10 | - | - | 3.04 | Clear | 17,370 | 27.62 | 10.60 | 14,392 | 26,330 | 1.83 | 157 | Pass |
| Comp Ex. 2 | 160 | 8 | - | - | 4.20 | Clear | 55,710 | 27.52 | 6.41 | 16,927 | 31,273 | 1.85 | 73 | 0.2 |

*Fig. 2B*

PREPARATION OF POLYAMIDE-IMIDE RESINS USING N-FORMYL MORPHOLINE:3-METHOXY N,N-DIMETHYLPROPANAMIDE

CROSS-REFERENCE TO RELATED APPLICATIONS

The present patent application claims priority to and incorporates by reference U.S. Provisional Patent Application No. 62/346,440, entitled "Novel Full Scale Process for Preparing Polymer Powders", filed on Jun. 6, 2016; U.S. Provisional Patent Application No. 62/346,443, entitled "Preparation Of Polyamide-Imide Resins Using N-Formyl Morpholine:3-Methoxy N,N-Dimethylpropanamide", filed on Jun. 6, 2016; and U.S. Provisional Patent Application No. 62/347,020, entitled "PAI-Based Coating Compositions", filed on Jun. 7, 2016.

TECHNICAL FIELD

Embodiments described herein generally relate to the field of chemical processing, and, more particularly, to preparation of polyamide-imide resins using N-Formyl Morpholine:3-Methoxy N,N-Dimethylpropanamide.

BACKGROUND

Polyamideimide and polyamide amic acid resin polymers (hereinafter referred to as PAI) are well-known thermally stable polymers that are used for many high performance coating applications due to their excellent adhesion, temperature resistance, and high strength.

A typical route to synthesizing polyamideimide polymers in a form that is convenient for the manufacture of coatings includes reacting diisocyanate, often 4,4'-methylene diphenyldiisocyanate (MDI) with trimellitic anhydride (TMA). In this process, PAI polymers are typically manufactured in polar aprotic solvents such as N-methyl amide compounds, including, but not limited to, dimethylformamide, dimethylacetamide, N-methylpyrrolidone (NMP), or N-ethylpyrrolidone.

However, with increasing regulation of certain materials and compounds, the solvents used in these polymerizations have recently come under scrutiny due to toxicological concerns.

BRIEF DESCRIPTION OF THE DRAWINGS

Embodiments described here are illustrated by way of example, and not by way of limitation, in the figures of the accompanying drawings in which like reference numerals refer to similar elements.

FIG. 2A is a table to summarize a first part of the information regarding production examples according to one or more embodiments; and FIG. 2B is a table to summarize a second part of the information regarding production examples according to one or more embodiments.

DETAILED DESCRIPTION

Figure 1:
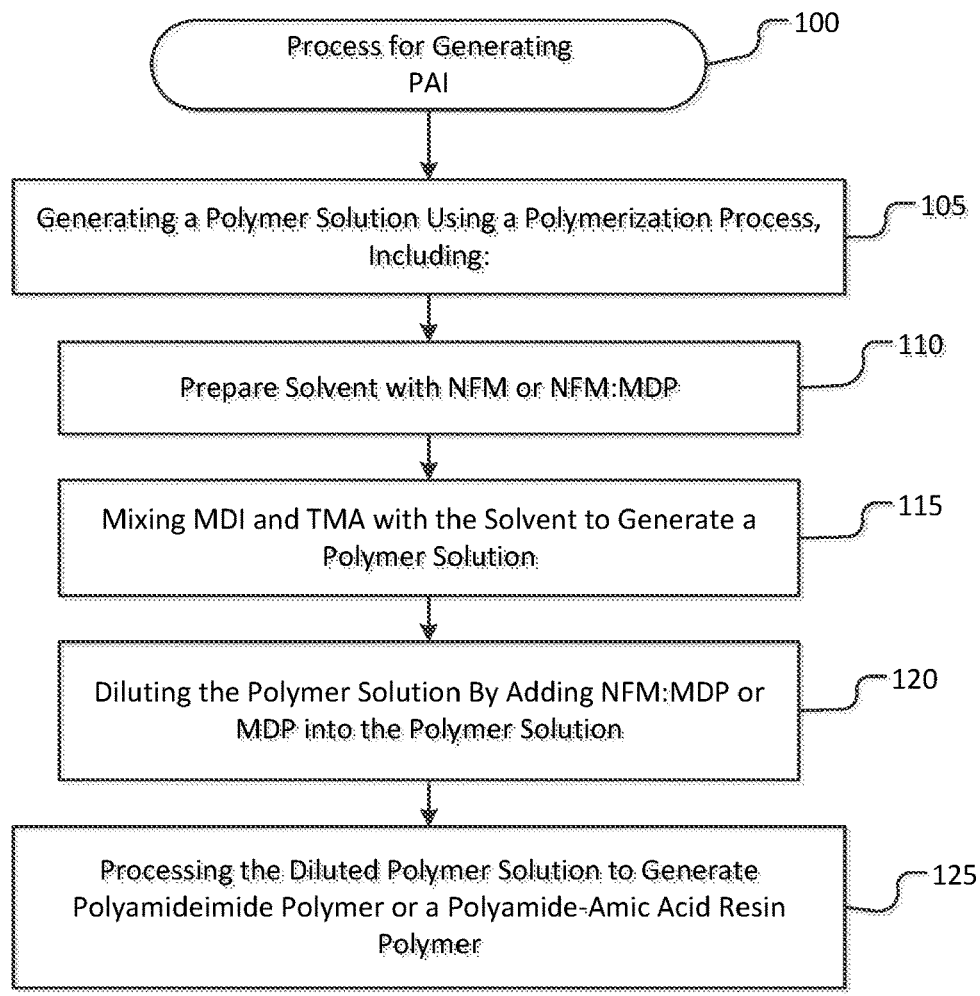
FIG. 1 is a flowchart to illustrate a process for preparation of polyamide-imide resins according to an embodiment.

Embodiments herein are generally directed to preparation of polyamide-imide resins using N-Formyl Morpholine:3-Methoxy N,N-Dimethylpropanamide.

Polyamideimide and polyamide amic acid resin polymers (hereinafter referred to as PAI) are thermally stable polymers that are used for many high performance coating applications due to desirable properties such as increased adhesion, temperature resistance, and high strength.

In some embodiments, polyamideimide materials are generated in CMR-free (CMR referring to carcinogenic, mutagenic, or reprotoxic substances) co-solvent systems such as N-formyl morpholine (NFM) in combination with 3-methoxy N,N-dimethylpropanamide (MDP). Some embodiments include the use of MDP as a co-solvent during the polymerization in varying amounts and as a diluent after polymerization, which is carried out in NFM. Test results of the resulting resin show favorable properties, demonstrating the applicability of CMR-free NFM-based PAI materials that contain MDP as a co-solvent.

Embodiments described herein relate generally to a low toxicity solvent system used for the manufacture and use of polyamideimide and/or polyamic acid resin. In some embodiments, solvent system can be used for either the manufacture of polyamideimide and/or polyamic acid resin or the dissolution of a polyamideimide and/or polyamic acid resins for use in coating solution applications.

This disclosure hereby incorporates by reference the previously filed U.S. patent application Ser. No. 14/687,771 titled "Low Toxicity Solvent System for Polyamideimide and Polyamide Amic Acid Resin Coating Solutions Thereof" filed on Apr. 15, 2015, further claiming priority to U.S. Provisional Patent Application Ser. No. 61/981,155 (herein referenced as the '771 patent application").

Efforts have been made to develop techniques to synthesize polyamide imide (PAI) compounds in non-toxic CMR free solvents that perform as well as N-methyl pyrrolidone (NMP) and/or n-ethyl pyrrolidone (NEP) based formulations. However, reformulating with new solvents is not a simple matter of substitution. Various factors need to be addressed if a different solvent is to be used in the synthetization of a polymer material. Some examples of physical properties that may determine suitability of a solvent for a given coating application include the solvent's solvency, polarity, relative evaporation rate, flash point and/or the like. Embodiments described herein variously provide for the use of a CMR free resin—e.g., to produce a fine resin with controlled properties to allow customers, including B2B (business to business) formulators, to have greater flexibility.

FIG. 1 is flowchart to illustrate a process for generation of PAI according to one or more embodiments. In some embodiments, a method for generation of PAI 100 includes:

(1) Generating a polymer solution using a polymerization process 105, where the polymerization process includes:
    (a) Preparing a solvent including at least N-formylmorpholine (NFM), or a combination of NFM and 3-methoxy N,N-dimethylpropanamide (MDP) as a co-solvent 110. In some embodiments, the prepared solvent includes one or more additional co-solvents selected from cyclohexanone, propylene carbonate, methylethyl ketone, or 2-octanone.
    (b) Mixing methylene diphenyl diisocyanate (MDI) and trimellitic anhydride (TMA) with the solvent to generate a polymer solution 115.
    (c) Diluting the polymer solution with an NFM:MDP solvent mixture or mixing MDP into the generated polymer solution 120. In some embodiments, the polyamideimide polymer solution is further combined with amine and water to produce a polyamic acid salt form of the polymer resin. In some embodiments, the polymer solution further includes one or more of lubricants, viscosity modifiers, colorant thickening agents, fillers, thinning solvents, thixotropic agents, binders, pigments, fillers, dispersants, surface tension modifiers, stabilizers, and fluoropolymers.

(2) Processing the diluted polymer solution to generate a polyamideimide polymer or a polyamide-amic acid resin polymer 125. In some embodiments, processing the diluted polymer solution includes adding the polymer solution to antisolvent to precipitate the resin solids in the mixture, and separating the precipitated resin solids from the solution. In other embodiments, the polymer solution is further diluted for a coating operation.

In some embodiments, the method further includes coating the diluted polymer solution onto a substrate surface to generate a coating; and curing the coating. In some embodiments, a coating composition includes a polyamideimide polymer or a polyamide amic acid resin polymer manufactured according to the method provided above.

FIGS. 2A and 2B illustrate features of Manufacturing Embodiment Examples and corresponding Coating Composition Embodiments of solvents and co-solvents each according to a corresponding embodiment.

More specifically, FIG. 2A provides the following with regard to each manufacturing embodiment example and coating composition example:
(a) Description of the polymerization solution;
(b) Amount of NFM in terms of grams of weight;
(c) Amount of MDP in terms of grams of weight;
(d) Amount of TMA in terms of grams of weight;
(e) Amount of MDI in terms of grams of weight;
(f) Ratio of moles of TMA to moles of MDI;
(g) Percent of solids in the polymer solution;
(h) Temperature and time for pre-polymer process.

FIG. 2B further provides the following with regard to each manufacturing embodiment example and coating composition example:
(a) Polymerization temperature and time for the polymer solution;
(b) Final mass of the polymer solution in terms of amine and water, if any;
(c) Turbidity of the polymer solution in NTUs (Nephelometric Turbidity Units);
(d) Visual haze for the polymer solution;
(e) Viscosity of the polymer solution in cP (Centipoise) (as measured by Brookfield DV-III rheometer);
(f) Percent of solids in the polymer solution;
(g) Acid value of the polymer solution in mg KOH/g (milligrams of potassium hydroxide (KOH) base required to neutralize the acid in one gram of the polymer).
(h) GPC (Gel Permeation Chromatography) data in terms of number average molecular weight, weight average molecular weight, and molecular weight ratio;
(i) Coating film thickness in microns (micrometers);
(j) Cracking of the coating under testing conditions.

The following examples are provided to illustrate certain embodiments, including examples of a comparative nature. However embodiments are not limited to these examples or to the specific manner in which the examples are implemented.

Manufacturing Embodiment Example 1
Manufacturing PAI in a 90:10 NFM:MDP Solution A 500 mL round bottom flask equipped with mechanical stirrer (200 rpm), condenser, and nitrogen bubbler is charged with 192.2 g N-formylmorpholine (NFM) and 21.35 g of 3-methoxy N,N-dimethylpropanamide (also known as "Equamide" or "Equamide M100" commercially available from Idemitsu or "KJCMPA-100" commercially available from KJ Chemicals or "3-methoxy-N,N-dimethylpropionamide" herein referred to as "MDP" in this embodiment). This is followed by the addition of 79.35 g methylene diphenyl diisocyanate (MDI), then 61.26 g of trimellitic anhydride (TMA). The reaction is then heated to 90° C. and held for 2 hours. After 2 hours, the temperature is increased to 160° C. and the reaction is held for 8 hours at 160° C. After 8 hours, the heating mantle is removed. The reaction is allowed to cool to ~90° C. and the appropriate amount of NFM:MDP solvent mixture is added. The solution is allowed to mix for an additional hour before cooling to room temperature to pack out. Analysis results of the manufactured solution shows: Viscosity (DVIII, 23° C.)=15,320 centipoise (cP); final solids resin concentration 28.54% by moisture balance (MB); and molecular weight (Mw)=17 kg/mol.

Manufacturing Embodiment Example 2
Manufacturing PAI in a 70:30 NFM:MDP Solution A 500 mL round bottom flask equipped with mechanical stirrer (200 rpm), condenser, and nitrogen bubbler is charged with 149.5 g NFM and 64.05 g of MDP. This is followed by the addition of 79.35 g MDI, then 61.26 g of TMA. The reaction is then heated to 90° C. and held for 2 hours. After 2 hours, the temperature is increased to 160° C. and the reaction is held for 8 hours at 160° C. After 8 hours, the heating mantle is removed. The reaction is allowed to cool to ~90° C. and the appropriate amount of NFM:MDP solvent mixture is added. The solution is allowed to mix for an additional hour before cooling to room temperature to pack out. Analysis results of the manufactured solution shows: Viscosity (DVIII, 23° C.)=20,590 cP; final solids resin concentration 26.42% (MB); and molecular weight (Mw)= 32 kg/mol.

Manufacturing Embodiment Example 3
Manufacturing PAI in a 30:70 NFM:MDP Solution A 500 mL round bottom flask equipped with mechanical stirrer (200 rpm), condenser, and nitrogen bubbler is charged with 64.05 g NFM and 149.5 g of MDP. This is followed by the addition of 79.35 g MDI, then 61.26 g of TMA. The reaction is then heated to 90° C. and held for 2 hours. After 2 hours, the temperature is increased to 160° C. and the reaction is held for 8 hours at 160° C. After 8 hours, the heating mantle is removed. The reaction is allowed to cool to ~90° C. and the appropriate amount of NFM:MDP solvent mixture is added. The solution is allowed to mix for an additional hour before cooling to room temperature to pack out. Analysis results of the manufactured solution shows: Viscosity (DVIII, 23° C.)=12,540 cP; final solids resin concentration 26.98% (MB); and molecular weight (Mw)= 41 kg/mol.

Manufacturing Embodiment Example 4
Manufacturing PAI in a 10:90 NFM:MDP Solution A 500 mL round bottom flask equipped with mechanical stirrer (200 rpm), condenser, and nitrogen bubbler is charged with 21.35 g NFM and 192.15 g of MDP. This is followed by the addition of 79.35 g MDI, then 61.26 g of TMA. The reaction is then heated to 90° C. and held for 2 hours. After 2 hours, the temperature is increased to 160° C. and the reaction is held for 8 hours at 160° C. After 8 hours, the heating mantle is removed. The reaction is allowed to cool to ~90° C. and the appropriate amount of NFM:MDP solvent mixture is added. The solution is allowed to mix for an additional hour before cooling to room temperature to pack out. Analysis results of the manufactured solution shows: Viscosity (DVIII, 23° C.)=7,797 cP; final solids resin concentration 25.98% (MB); and molecular weight (Mw)=46 kg/mol.

Coating Composition Embodiment Example 1

The PAI polymer solution dissolved in 90:10 NFM:MDP solution described in Manufacturing Embodiment Example 1 was further diluted using the appropriate solvent ratio to a viscosity of ~10 k cP, coated on an aluminum substrate to a thickness of 135 μm, and cured at 250° C. Conical Mandrel Bend testing was performed according to ASTMD522 and the film passed with no evidence of cracking.

Coating Composition Embodiment Example 2

The PAI polymer solution dissolved in 70:30 NFM:MDP solution described in Manufacturing Embodiment Example 2 was further diluted using the appropriate solvent ratio to a viscosity of ~10 k cP, coated on an aluminum substrate to thicknesses of both 140 and 160 μm, and cured at 250° C. Conical Mandrel Bend testing was performed according to ASTMD522 and the films passed with no evidence of cracking.

Coating Composition Embodiment Example 3

The PAI polymer solution dissolved in 30:70 NFM:MDP solution described in Manufacturing Embodiment Example 3 was further diluted using the appropriate solvent ratio to a viscosity of ~10 k cP, coated on an aluminum substrate to a thickness of 130 μm, and cured at 250° C. Conical Mandrel Bend testing was performed according to ASTMD522 and the film passed with no evidence of cracking.

In Manufacturing Embodiment Examples 1-4 of this invention, PAI was polymerized at ~34.5% solids in NFP:MDP ranging from 90:10 to 10:90 ratio by mass. The preferred ratio of NFM to MDP co-solvent is from 99:1 to 1:99 and more preferably in a range from 90:10 to 10:90 by mass. The solvent mixture or ratio of NFM:MDP plays a large role in the final properties of the material. As can be seen by Manufacturing Embodiment Example 1, a higher NFM content leads to a slower polymerization rate as the final Mw obtained was only 17 kg/mol. This demonstrates the ability of the co-solvent ratio to control the reaction rate. Furthermore, Manufacturing Embodiment Example 1 had the highest ratio of NFM (90:10 NFM:MDP by mass) which contributed to the viscosity of the final sample which was 15 k cP, even though the Mw was the lowest of all the samples. This demonstrates that the solvent ratios of NFM:MDP are also having an effect on the final viscosity of the formulation and most likely also creating subtle differences in the polymer structure which can also affect the viscosity.

The monomers used for the preparation of this PAI were methylene diphenyl diisocyanate (MDI) and trimellitic anhydride (TMA). The success of these examples demonstrates that other isocyanate and anhydride monomer combinations could be used to effectively make PAI in NFM:MDP mixtures by those who are skilled in the art using monomers including but not limited to methylenedianiline, trimellitic acid anhydride chloride, pyromellitic dianhydride, and derivatives thereof. The molar ratio of TMA:MDI used in this embodiment was 1.01:1.00, with the preferred values ranging from 1.1:1.0 to 1.0:1.1, most preferred being 1.01:1.00 to 1.00:1.01.

The reaction solids chosen for Manufacturing Embodiment Examples 1-4 of this invention was 34.5 percent solids (theoretical after accounting for carbon dioxide loss). In order to manufacture a clear, non-hazy PAI solution free from precipitates, it is crucial to have effective ratios of solvents, co-solvents and polyamide imide. In some embodiments, the ratio of the total of NFM plus MDP co-solvent to polyamideimide may be preferably in a range from 85:15 (15% solids) to 55:45 and more preferably from 80:20 to about 60:40. The concentration plays a large role in the rate of the reaction, and with viscous step-growth polymerizations, control can be easily be lost leading to rapid viscosity build if the proper conditions are not selected. Further, the concentration also affects the solubility of the final material. Polyamideimides are known for not being easily solubilized due to their rigid structure. It should be noted that the PAI solutions polymerized at 34.5% solids in varying ratios of NFM:MDP all resulted in solutions which were free from precipitation, except Manufacturing Embodiment Example 4 which had the highest amount of MDP (10:90 NFM:MDP).

The PAI polymerizations in NFM:MDP were carried out in two steps: first they were heated to 90° C. for 2 hours. The temperature and time could vary with temperatures ranging from 70 to 110° C. with more preferred temperatures of 80 to 100° C. The times of this initial step could vary from 0.5 to 4 hours with the most preferred being 1 to 3 hours. The PAI polymerizations were then heated to 160° C. for 8 hours. The temperature and time could vary with temperatures ranging from 110 to 190° C., with more preferred temperatures of 120 to 170° C. The times of this initial step could vary from 1 to 12 hours, with the most preferred time being 4 to 10 hours.

The turbidity of all of the NFM:MDP polymerization solutions were measured. All of which were visually clear except Manufacturing Embodiment Example 4, which had the highest amount of MDP (10:90 NFM:MDP) and had the highest turbidity of 11.4 NTUS. The viscosity at ambient temperature and final solids using a moisture balance (MB) of all of the solutions was measured. It is understood that the final solids could be potentially be lowered using the appropriate NFM:MDP ratio to obtain a desired viscosity. However, this could affect the throughput of the process. Furthermore, the final solids of the PAI solution can affect the maximum thickness obtainable with a single pass when a birdbar or drawdown bar is used. The final viscosity is also important as it is a key parameter for the end use of PAI applications such as spray coatings. The final viscosity of the PAI in various NFM:MPD ratios can be in the range of 1000 cP to 30,000 cP, with more preferred being 4,000 cP to 12,000 cP. The final solids can range from 10 to 50% solids, more preferred range being 25 to 40% solids. The acid number of the examples ranged from 8-11 mg KOH/g of polymer and is a function of numerous parameters such as the dryness of the solvents and the conditions of the polymerization. The acid number is a measurement of the amic acid content in the PAI and correlates to the solubility of the PAI in polar aprotic solvents. The acid number can range from 5 to 100 mg KOH/g of polymer, with a more preferred range being 8-70 mg KOH/g polymer.

The PAI polymerized in mixtures of NFM:MDP were characterized using GPC analysis. The weight average molecular weight (Mw) was measured and ranged between 17-46 kg/mol for the examples. It should be noted that there was a Mw trend observed with increasing MDP content, and that the sample with the greatest amount of MDP was the sample that obtained the highest molecular weight in 8 hours at 160° C. (46 kg/mol; 10:90 NFM:MDP). This suggests a direct correlation between the polymerization rate and the ratio of MDP and indicates the ratio could be easily used to control the reaction rate and possibly further the final Mw by fine-tuning such parameters in conjunction with the reaction time and/or concentration by one who is skilled in the art.

Coating Composition Embodiment Examples 1-3 were prepared by taking the PAI polymer solution dissolved in the NFM:MDP solutions described in Manufacturing Embodiment Example 1-3, and further diluting the solutions using the appropriate solvent ratio to a viscosity of ~10 k cP. The solutions were then coated on an aluminum substrate to a thickness ranging from 130-160 µm and cured at 250° C. In the coating process, only Manufacturing Embodiment Example 4 failed to make a film due to adhesion issues. Conical Mandrel Bend testing was performed according to ASTMD522 and the films passed with no evidence of cracking. This is a positive result at these thicknesses that demonstrates that this PAI material may be utilized not only in thin film applications but also in market segments where thicker (>100 µm) films are required.

Manufacturing Embodiment Example 5
Manufacturing PAI in 100% NFM then Diluting to 70:30 NFM:MDP The procedure of Manufacturing Embodiment Example 4 was substantially repeated with the following exceptions. The polymerization took place in 100% NFM (0% MDP). Following polymerization the appropriate amount of MDP was added back to give a 70:30 NFM:MDP ratio at ~28% solids solution. This is distinguished from Manufacturing Embodiment Example 2 wherein the PAI was synthesized and the solvent ratio was 70:30 NFM:MDP throughout the polymerization. Analysis results of the manufactured solution shows: Viscosity (DVIII, 23° C.)=27,128 cP; final solids resin concentration=28.16% (MB); and molecular weight (Mw)=31,459 kg/mol.

Coating Composition Embodiment Example 4

The PAI polymer solution polymerized in 100% NFM then diluted to 70:30 NFM:MDP as described in Manufacturing Embodiment Example 5 was further diluted using the appropriate solvent ratio to a viscosity of ~10 k cP, coated on an aluminum substrate to a thickness of 80 µm, and cured at 250° C. Conical Mandrel Bend testing was performed according to ASTMD522 and the film passed with no evidence of cracking.

It is important to note the difference between Manufacturing Embodiment Example 2, wherein the PAI was synthesized and the solvent ratio was 70:30 NFM:MDP throughout the polymerization, and Manufacturing Embodiment Example 5, wherein the polymerization takes place in 100% NFM and then is diluted to 70:30 NFM:MDP with MDP once the polymerization is complete. The two different examples serve to show that MDP can be used in conjunction with NFM as a co-solvent during polymerization as well as a dilution solvent in cases where the polymerization solvent was NFM alone. The two cases generate strikingly different results. Manufacturing Embodiment Example 2 resulted in a material with similar molecular weight and solids, but much lower viscosity. This once again demonstrates that the MDP when present during the polymerization is taking an active role in affecting the polymer structure and resulting properties. Note that in this embodiment that MDP may be used in a range of ratios with the NFM as a dilution co-solvent, with the preferred range being 1:99 to 99:1 NFM:MPD, more preferably in a range from 90:10 to 10:90 by mass. In some embodiments, the ratio of the total of NFM plus MDP post-polymerization diluent to polyamideimide may be preferably in a range from 85:15 (15% solids) to 55:45, and more preferably in a range from 80:20 to about 60:40.

The PAI polymer solution polymerized in 100% NFM then diluted to 70:30 NFM:MDP was further diluted using the appropriate solvent ratio to a viscosity of ~10 k cP. It should be noted that the solution had a much lighter color than the solution polymerized in the 70:30 NFM:MDP mixture. This is due to the fact that the solution was polymerized in 100% NFM and then diluted with MDP (having the MDP present during the polymerization resulting in increasing darker brown appearance to the resin). This likewise translated to a lighter film color after coating on an aluminum substrate to a thickness of 80 µm and curing at 250° C. Conical Mandrel Bend testing was performed according to ASTMD522 and the film passed with no evidence of cracking and much lighter color than commercial pyrrolidone-based formulations.

Manufacturing Embodiment Example 6
Manufacturing PAI in a 70:30 NFM:MDP Solution and then Converting to a Water-Based Formulation The procedure of Manufacturing Embodiment Example 2 was followed except, after cooling the 70:30 NFM:MDP PAI polymer solution to ~90° C. once the polymerization is complete, instead of diluting with the appropriate amount of NFM:MDP, tirethylamine (TEA) is added over 40 minutes followed by a 1 hour hold. The temperature is maintained at ~90° C. and water is added over 40 minutes followed by a 1 hour hold. Analysis results of the manufactured solution shows: Viscosity (DVIII, 23° C.)=6,366 cP; final solids resin concentration 28.10% (MB); and molecular weight (Mw)= 23 kg/mol Manufacturing Embodiment Example 7
Manufacturing PAI in a 100% NFM Solution and then Converting to a Water-Based Formulation The procedure of Manufacturing Embodiment Example 5 was followed except, after cooling the PAI solution in 100% NFM to ~90° C. once the polymerization is complete, instead of diluting with the appropriate amount of NFM:MDP, tirethylamine (TEA) is added over 40 minutes followed by a 1 hour hold. The temperature is maintained at ~90° C. and water is added over 40 minutes followed by a 1 hour hold. Analysis results of the manufactured solution shows: Viscosity (DVIII, 23° C.)=6,549 cP; final solids resin concentration=28.00% (MB); and molecular weight (Mw)= 26 kg/mol In addition to the desire to obtain PAI in CMR-free NFM:MDP solvent-based systems, there is also the desire to have PAI in CMR-free water-based formulations that can be utilized in aqueous customer formulations. To this end, Manufacturing Embodiment Example 6 describes taking a 70:30 NFM:MDP solution and converting it to a water-based formulation using TEA and water. The ratio of NFM:MDP used in the example was 70:30. However, it is understood that any of the range of NFM:MDP could have been utilized, with a preferred range being 1:99 to 99:1 NFM:MDP, and more preferably in a range from 90:10 to 10:90 by mass. Manufacturing Embodiment Example 7 demonstrates this as in this example, the polymerization was carried out in 100% NFP (0% MDP) and converted to a water-based material. In some embodiments, the ratio of the total of NFM plus MDP plus amine plus water to polyamideimide may be preferably in a range from 85:15 (15% solids) to 55:45 and more preferably from 80:20 to about 60:40.

Further, embodiments are not limited to the co-solvent used in conjunction with NFM before converting to a water-based PAI being MDP, and alternatively may include methyl actetate, n-propyl acetate, t-butyl acetate, iso-butyl acetate, ethyl acetate, isopropyl acetate, methyl lactate, ethyl lactate, n-propyl lactate, isopropyl lactate, n-butyl lactate, isobutyl lactate, t-butyl lactate, cyclohexanone, cyclopentanone, n-butyl acetate, methyl alcohol, ethyl alcohol, isopropyl alcohol, anisol, n-acetyl morpholine, ε-caprolactone, methylcyclohexane, N-n-butylpyrrolidone, N-isobutylpyrrolidone, N-t-butylpyrrolidone, N-n-pentylpyrrolidone, N-(methyl-substituted butyl) pyrrolidone, ring-methyl-substituted N-propyl pyrrolidone, ring-methyl-substituted N-butyl pyrrolidone, N-(methoxypropyl) pyrrolidone, N-(methoxypropyl) pyrrolidone, 1,5-dimethyl-pyrrolidone and isomers thereof, dipropylene glycol dimethyl ether, a mixture including ethyl lactate and an ethyl ester derived from soya bean oil or corn oil, poly(ethylene glycol) dimethyl ether, diethylene glycol diethyl ether, 1,3-dioxolane, dimethyl sulphoxide, methyl-5-(dimethylamino)-2-methyl-5-oxopentanoate, Tami Solve® NxG, propylene glycol methyl ether acetate, choline hydroxide, propylene carbonate, diethyl carbonate, glycerine carbonate, dimethylisopropylamine and isomers thereof, dihydrolevo glucosenone, octyl pyrrolidone and isomers thereof, N-methyl-ε-caprolactam, N,N,N',N'-tetramethylguanidine, 2-pyrrolidone, 2,2-dimethyl dioxolane-4-methanol and isomers thereof, Rhodiasolv® RPDE-K, Rhodiasolv® PolarClean, Rhodiasolv® Infinity, Rhodiasolv® IRIS, diethylethanolamine and, N-ethylmorpholine, γ-hexalactone, tetrahydrofuran, furfuryl alcohol, acetophenone, cumene, cyclopentylmethyl ether, methyl-tetrahydrofuran, N-octyl pyrrolidone, dioxalane, methylethylketone, dimethyl succinate, N-methylcaprolactame and N-cyclohexylpyrrolidone.

It is further noted that numerous amines may be utilized to convert NFM and NFM:MDP of NFM:co-solvent formulations to the corresponding water-based products including but not limited to TEA, Dimethylethanolamine (DMEA), trimethyl amine, diethyl 2-hydroxyethyl amine, tripropyl amine, tributyl amine, tris(2-hydroxyethyl)amine, N,N-dimethylaniline, morpholine, pyridine, N-methyl-pyrrole, ethyl bis(2-hydroxyethyl)amine, and mixtures thereof. The percentage of amine in the final PAI water-based formulation by mass could may range from 2 to 50%, with a more preferred range being 5-10% amine. Additionally, the percentage of water in the final PAI water-based formulation by mass may range from 5 to 50%, with a more preferred range being 5 to 35%.

The 70:30 NFM:MDP water-based PAI in Manufacturing Embodiment Example 6 was clear (turbidity of 2.7 NTUS) and had a high acid number of 128 mg KOH/g polymer. This may occur for PAI water-based materials as the reaction step with the amine and water converts the PAI to a more polyamide amic acid (—COOH) structure with a greater number of carboxylic acid functionalities, therefore greatly decreasing the imidization of the structure and increasing the water solubility. The clarity, low turbidity and high acid number were mirrored in the 100% NFM sample that was converted to water-based PAI. Both water-based PAI samples showed appreciable molecular weight ranging from 23-26 kg/mol.

Comparative Example 1
Manufacturing PAI in 100% NFM then Diluting to 70:30 NFM:CHN This Comparative Example 1 relates to '771 patent application and is provided in this embodiment as a comparative example. The procedure of Manufacturing Embodiment Example 4 was substantially repeated with the following exceptions. The polymerization took place in 100% NFM. Following polymerization the appropriate amount of cyclohexanone (CHN) was added back to give a 70:30 NFM:CHN ratio at ~28% solids solution. Analysis results of the manufactured solution shows: Viscosity (DVIII, 23° C.)=17,370 cP; final solids resin concentration=27.62% (MB); and molecular weight (Mw)=26 kg/mol.

The PAI polymer solution described above in Comparative Example 1 was further diluted using the appropriate solvent ratio to a viscosity of ~10 k cP, coated on an aluminum substrate to a thickness of 157 μm, and cured at 250° C. Conical Mandrel Bend testing was performed according to ASTMD522 and the film passed with no evidence of cracking.

Note that while films made of Comparative Example 1 passed the Conical Mandrel Bend testing at thicknesses of 157 μm, the films of Manufacturing Embodiment Example 2 were able to reach thicknesses of 160 μm without cracking and the resin material itself was able to have a comparable viscosity at even higher molecular weights. This demonstrates how the embodiments are improvements upon previous knowledge and the comparative examples contained therein.

Comparative Example 2
Manufacturing PAI in 100% NFM then Diluting to 70:30 NFM:PC This Comparative Example 2 related to '771 patent application and is provided in this embodiment as a comparative example. The procedure of Manufacturing Embodiment Example 4 was substantially repeated with the following exceptions. The polymerization took place in 100% NFM. Following polymerization the appropriate amount of propylene carbonate (PC) was added back to give a 70:30 NFM:PC ratio by mass at ~28% solids solution. Analysis results of the manufactured solution shows: Viscosity (DVIII, 23° C.)=55,710 cP; final solids resin concentration=27.52% (MB); and molecular weight (Mw)=31 kg/mol.

The PAI polymer solution described above in Comparative Example 2 was further diluted using the appropriate solvent ratio to a viscosity of ~10 k cP, coated on an aluminum substrate to a thickness of 73 μm, and cured at 250° C. Conical Mandrel Bend testing was performed according to ASTMD522 and the film failed showing cracking at 0.2 cm.

The resin solution made in Comparative Example 2 had an extremely high viscosity at 56 k cP (DVIII, 23° C.). Furthermore films made of this NFM:PC were not flexible and failed Conical Mandrel Bend testing. These results demonstrate how numerous parameters must be considered when choosing an NFM co-solvent (the effect on viscosity, curing, final film mechanical properties, for example) and once again demonstrate how the embodiments presented here build upon previous knowledge and the comparative examples contained therein.

What is claimed is:

1. A coating composition including a polyamideimide polymer or a polyamide amic acid resin polymer manufactured according to a process including:
   preparing a solvent including N-formylmorpholine (NFM) or a combination of NFM and 3-methoxy N,N-dimethylpropanamide (MDP) as a co-solvent;
   mixing methylene diphenyl diisocyanate (MDI) and trimellitic anhydride (TMA) with the solvent to generate the polymer solution;
   diluting the polymer solution by adding an NFM:MDP solvent mixture or MDP into the generated polymer solution; and
   processing the diluted polymer solution to generate a polyamideimide polymer or a polyamide-amic acid resin polymer in a coating solution.

2. The coating composition of claim 1, wherein the coating composition may be implemented to generate a coating by:

coating the diluted polymer solution onto a substrate surface to generate the coating; and
curing the coating.

3. The coating composition of claim 1, wherein the polymer solution is further combined with amine and water to produce a polyamic acid salt form of the polyamide-amic acid resin polymer.

4. The coating composition of claim 1, wherein the prepared solvent includes one or more additional co-solvents selected from cyclohexanone, propylene carbonate, methylethyl ketone, or 2-octanone.

5. The coating composition of claim 1, wherein the polymer solution further includes one or more lubricants, viscosity modifiers, colorant thickening agents, fillers, thinning solvents, thixotropic agents, binders, pigments, fillers, dispersants, surface tension modifiers, stabilizers and fluoropolymers.

6. The coating composition of claim 3, wherein the prepared solvent includes one or more additional co-solvents selected from cyclohexanone, propylene carbonate, methylethyl ketone, or 2-octanone.

7. The coating composition of claim 4, wherein the polymer solution further includes one or more lubricants, viscosity modifiers, colorant thickening agents, fillers, thinning solvents, thixotropic agents, binders, pigments, fillers, dispersants, surface tension modifiers, stabilizers and fluoropolymers.

8. The coating composition of claim 6, wherein the polymer solution further includes one or more lubricants, viscosity modifiers, colorant thickening agents, fillers, thinning solvents, thixotropic agents, binders, pigments, fillers, dispersants, surface tension modifiers, stabilizers and fluoropolymers.

9. The coating composition of claim 1, wherein when preparing a solvent including N-formylmorpholine (NFM) or a combination of NFM and 3-methoxy N,N-dimethylpropanamide (MDP) as a co-solvent, excess NFM by weight, is used relative to MDP.

10. The coating composition of claim 9, wherein when preparing a solvent including N-formylmorpholine (NFM) or a combination of NFM and 3-methoxy N,N-dimethylpropanamide (MDP) as a co-solvent, excess MDP by weight, is used relative to NFM.

* * * * *